(12) United States Patent
Tsukada et al.

(10) Patent No.: US 8,185,765 B2
(45) Date of Patent: May 22, 2012

(54) STORAGE APPARATUS AND ITS POWER SAVING CONTROL METHOD

(75) Inventors: Masaru Tsukada, Odawara (JP); Hidetoshi Sakaki, Odawara (JP); Yoshihiro Asaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 12/440,508

(22) PCT Filed: Feb. 16, 2009

(86) PCT No.: PCT/JP2009/053113
§ 371 (c)(1),
(2), (4) Date: Mar. 9, 2009

(87) PCT Pub. No.: WO2010/092699
PCT Pub. Date: Aug. 19, 2010

(65) Prior Publication Data
US 2010/0313043 A1 Dec. 9, 2010

(51) Int. Cl.
*G06F 1/32* (2006.01)
(52) U.S. Cl. .......................... 713/324; 713/300; 713/320
(58) Field of Classification Search .................. None
See application file for complete search history.

(56) References Cited

U.S. PATENT DOCUMENTS

| | | |
|---|---|---|
| 2006/0193073 A1 | 8/2006 | Hakamata et al. |
| 2008/0040543 A1 | 2/2008 | Yamazaki et al. |
| 2008/0104339 A1 | 5/2008 | Nakagawa et al. |
| 2008/0168223 A1* | 7/2008 | Reeves et al. ............... 711/114 |
| 2008/0288795 A1* | 11/2008 | Maruyama et al. .......... 713/320 |
| 2009/0006876 A1* | 1/2009 | Fukatani et al. ............. 713/320 |

FOREIGN PATENT DOCUMENTS

| | | |
|---|---|---|
| EP | 1 591 881 | 11/2005 |
| EP | 1 770 497 | 4/2007 |
| JP | 2000-293314 | 10/2000 |
| JP | 2008-112293 | 5/2008 |
| JP | 2008-250506 | 10/2008 |

* cited by examiner

*Primary Examiner* — Dennis M Butler
(74) *Attorney, Agent, or Firm* — Antonelli, Terry, Stout & Kraus, LLP.

(57) ABSTRACT

Provided are a storage apparatus and its power saving control method capable of performing sufficient power saving to multiple memory devices without deteriorating the response performance to a host system. If multiple logical volumes formed in disk drives configuring a parity group are in an offline status where a path group from the host computer is not set, a control processor sets the multiple disk drives of the parity group to a power saving status.

11 Claims, 12 Drawing Sheets

FIG.3

| PATH GROUP ID  DEV# | ID#01 | ID#02 | ID#03 | ... | ID#0n |
|---|---|---|---|---|---|
| x0000 | ○ | | | | ○ |
| x0001 | ○ | | ○ | | |
| x0002 | | ○ | ○ | | |
| ⋮ | | | | | |
| xFEFF | ○ | ○ | ○ | | ○ |

FIG.4

| DEV# | PARITY GR# | ARRANGEMENT # WITHIN PARITY GR | CONNECTION STATUS |
|---|---|---|---|
| x0000 | 0 | 0 | OFFLINE |
| x0001 | 1 | 0 | OFFLINE |
| x0002 | 2 | 0 | ONLINE |
| x0003 | 1 | 1 | OFFLINE |
| x0004 | 2 | 1 | OFFLINE |
| x0005 | 1 | 2 | ONLINE |
| x0006 | 2 | 2 | ONLINE |
| x0007 | 1 | 3 | ONLINE |
| ⋮ | | | |
| xFEFF | 0 | 87 | ONLINE |

FIG.6

| PARITY GR# | POWER SAVING/ INHIBITION FLAG | POWER SAVING PATTERN | POWER SAVING-TARGET BITMAP |
|---|---|---|---|
| 0 | OFF | VTOC ON | 80118888 FFFF00FF ⋯ 0000FFFF |
| 1 | ON | ALL OFF | C0FFFFFF FFFFFFFF ⋯ FFFFFFFF |
| 2 | OFF | VTOC RESIDENT | 40100000 00000000 ⋯ 00000000 |
| ⋮ | | | |
| 17 | ON | ALL OFF | 88888888 FFFFFFFF ⋯ 00000000 |

FIG.9

| SENSE SYSTEM | CONTROL SYSTEM |
|---|---|
| Sense ID | Set Path-Group ID |
| Sense Path group ID | Perform Subsystem Function |
| Read Device Characteristics | ETC. |
| Read Configuration Data | |
| Sense Subsystem Status | |
| ETC. | |

STORAGE APPARATUS AND ITS POWER SAVING CONTROL METHOD

TECHNICAL FIELD

The present invention generally relates to a storage apparatus, and in particular relates to a storage apparatus comprising a function of subjecting memory devices to power saving. The present invention additionally relates to a power saving control method in such a storage apparatus.

BACKGROUND ART

In recent years, the amount of information that is being handled by storage apparatuses is increasing dramatically. And in order to realize the redundancy of data, the storage systems of storage apparatuses are also being configured in RAID. Thus, the memory capacity of storage apparatuses is also increasing dramatically to terabyte levels, and consequently the number of disk drives that are mounted on a storage apparatus is also ever-increasing. Pursuant to the increase in the number of disk drives that are mounted, the power consumption of storage apparatuses is also increasing, and demands for realizing the power saving of storage apparatuses are growing.

Conventionally, storage apparatuses consumed wasteful power as a result of constantly setting the disk drives in a ready status regardless of the usage status of the mounted hard disk devices. In light of this, Japanese Patent Laid-Open Publication No. 2000-293314 discloses turning off the power of disk drives that were not accessed for a given period of time. However, this power saving technology has a problem in that much time is required for the start-up of a disk drive when such disk drive, in which the power was turned off, is accessed.

Thus, in order to overcome this problem, a storage apparatus has been proposed for achieving power saving while maintaining the access performance to disk devices by managing the power source of the disk devices according to a schedule (Japanese Patent Laid-Open Publication No. 2008-112293).

In addition, there is also a system of achieving both the performance and power saving of a storage apparatus by the storage apparatus receiving a notice on the usage status of the logical units from the host system, and changing the power saving status of the disk drives according to the status of the logical units (Japanese Patent Laid-Open Publication No. 2008-250506).

RELATED ART DOCUMENTS

Patent Documents

[Patent Document 1] Japanese Patent Laid-Open Publication No. 2000-293314
[Patent Document 2] Japanese Patent Laid-Open Publication No. 2008-112293
[Patent Document 3] Japanese Patent Laid-Open Publication No. 2008-250506

DISCLOSURE OF THE INVENTION

With the conventional technology described in foregoing Japanese Patent Laid-Open Publication No. 2008-112293, if an unexpected access that is not in the schedule is made from the host system to the storage apparatus, the disk device in the power saving status is unable to immediately return to its operating condition, and the response performance of the storage apparatus will be insufficient.

With the conventional technology described in foregoing Japanese Patent Laid-Open Publication No. 2008-250506, interaction with the host system will be required in order for the storage apparatus to achieve the power saving function, and, in addition, it will not be possible to apply the power saving function to the disk devices related to the logical units that are not connected to the host system.

In light of the above, an object of the present invention is to provide a storage apparatus and its power saving control method capable of performing sufficient power saving to a plurality of memory devices without deteriorating the response performance to a host system.

In order to achieve the foregoing object, the storage apparatus of the present invention determines whether the logical volumes provided in the storage apparatus are of an online status in which a logical path is formed to a host system or an offline status in which such connection is canceled, and, when the plurality of logical volumes set in a plurality of memory devices are of an offline status, the storage apparatus shifts the plurality of memory devices to a power saving status. When a command for changing the logical volumes in an offline status into an online status is sent from the host computer to the storage apparatus, the response from the storage apparatus to the host computer is delayed within the window of timeout to the host system, and the plurality of memory devices are started up during this time so as to enable the processing of the read command from the host computer to the memory device.

EFFECT OF THE INVENTION

As described above, according to the present invention, since the power saving of memory devices can be performed based on the status of the logical volumes without requiring any interaction with the host system, it is possible to provide a storage apparatus and its power saving control method that can contribute to power saving without deteriorating the response performance to the host system.

BRIEF DESCRIPTION OF THE DRAWINGS

FIG. 3 shows an example of a path group management table;

FIG. 4 shows an example of a volume management table;

FIG. 6 is a bitmap table showing the logical volumes to be subject to power saving;

FIG. 9 is a diagram showing an example of a sense/control system command;

BEST MODE FOR CARRYING OUT THE INVENTION

Figure 1:
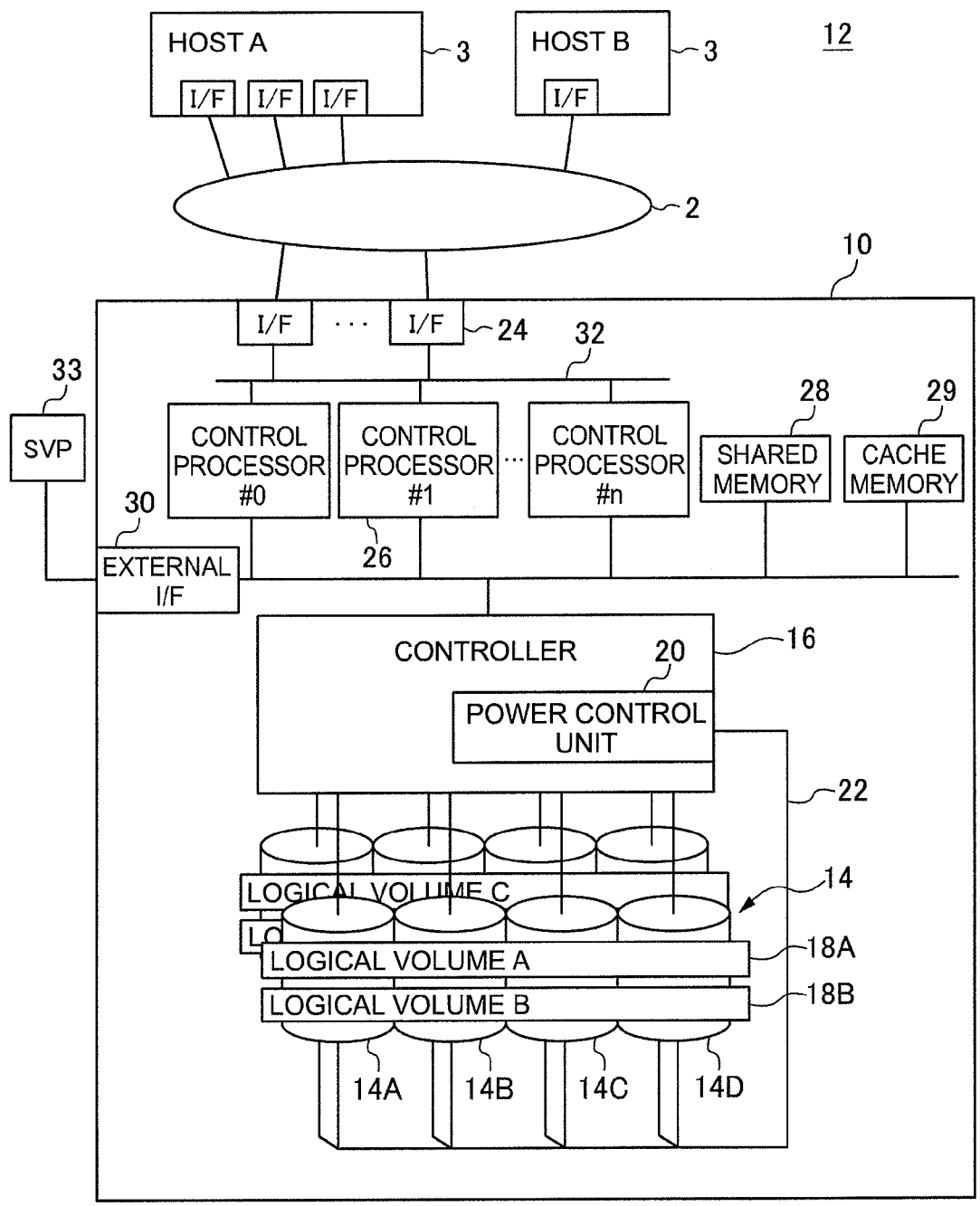
FIG. 1 is a hardware block diagram of a storage control system comprising an example of a storage apparatus according to the present invention.

FIG. 1 is a block diagram showing the configuration of a storage control system 12 including a storage apparatus 10 according to an example of the present invention. As shown in FIG. 1, the storage control system 12 comprises a host computer 3 and the storage system 10 connected to a network 2, and for instance is configured as a business system of banks, a seat reservation business system of airline companies, or the like.

The network 2 is a SAN (Storage Area Network), LAN (Local Area Network), Internet or the like, and includes a network switch, a hub and the like. The network 2 may also be configured as a one-to-one connection such as when connecting with a SCSI (Small Computer System Interface) interface. More specifically, the network 2 is a SAN (FC-SAN) using the Fibre Channel protocol.

The host computer (host system) 3 constitutes, for example, the core of a business system of banks and a seat reservation business system of airline companies. Specifically, the host computer 3 comprises hardware resources such as a processor, a main memory, a communication interface and a directly connected input/output (I/O) device, and also comprises software resources such as a device driver, an operating system (OS) and an application program. Consequently, the host computer 3 is able to execute various programs under the control of the processor and realize the intended processing through coordination with the hardware resources. For example, the host computer 3 is able to realize the foregoing business systems, interdependently with the storage apparatus (storage subsystem) 10 described in detail below, by executing business application programs on the OS under the control of the processor.

The storage apparatus 10 comprises a plurality of memory devices 14, and a controller 16 for controlling the I/O such as writing into or reading from the memory devices 14.

The memory devices 14 are drives configured by including a memory medium such as a hard disk or a nonvolatile memory. The disk drives 14 configure RAID (Redundant Arrays of Independence Disks). A plurality of disk drives 14 form one virtual device (VDEV: Virtual Device) as a parity group. Logical volumes (these are also sometimes referred to as logical devices (LDEV)) are allocated to the parity group, and a cylinder number and a head number are defined in each logical volume. The host computer 3 is able to access data stored in an arbitrary storage area of a specific logical volume by giving an address to the respective logical volumes and giving the cylinder number and head number to the control unit of the storage apparatus 10. FIG. 1 shows that the disk drives 14A to 14D configure one parity group, and that the logical volumes (LDEV) A, B are set therein.

Each disk drive 14 is provided with a power control unit 20 for controlling the feed to the disk drives. The power control unit 20 is connected to the respective disk drives via a power cable 22. The power cable 22 is configured, for instance, from a power supply line and a control line.

The storage apparatus 10 comprises an interface circuit (I/F) 24 for performing input/output processing with the host computer 3, a plurality of control processors 26 for realizing the I/O processing between the host computer 3 and the disk devices 14, a shared memory 28 for storing control information to be shared among a plurality of control processors, control information such as the configuration information of storage apparatuses, and directory information in the cache operation, a cache memory 29 for temporarily storing data to be exchanged between the host computer 3 and the disk drives 14, and an external I/F unit 30 for connecting a service processor (SVP) 32. Each of these modules is mutually connected via a connection 32.

The shared memory 28 additionally stores a path group management table (FIG. 5) for managing the path group to be set to the logical volumes when the host computer 3 accesses the logical volumes, a volume management table (FIG. 4) for managing the logical volumes, and a bitmap table (FIG. 6) for deciding the target volumes when subjecting the disk drives to power saving.

The control processor 26 functions as a control unit for controlling the I/O access with the host computer 3 connected via the network 2, and additionally functions as a control unit for controlling the I/O access with the disk drives 14. Although FIG. 1 shows a stand-alone control processor that executes both of the foregoing functions, the control processor may also be configured from a plurality of control circuits that separately and respectively execute the two functions.

The control processor 26 extracts data from the cache memory 29, stores the data in the disk drive 14, reads the data from the disk drive 14, and writes the data into the cache memory 29. The control processor 26 also performs RAID control of the disk drives 14. The I/O control of the disk drives 14 is performed via the controller 16.

The controller has a power control unit 20, and the power control unit 20 controls, via the cable 22, the feed unit of the disk drives 14 connected to the cable 22. Specifically, when the power control unit 20 is to turn off the power of a specific disk drive it commands the corresponding feed unit to stop the power supply, and in response the feed unit stops the power supply to the disk drive. The feed unit also controls the power saving function of the disk drives. The power saving function includes a plurality of modes; namely, a mode for turning off the power of the disk drive as the first mode, a mode for setting the disk drive to a low rotation as the second mode, and a mode for subjecting the disk drive to spindown as the third mode. When the disk drive is any one of these modes, this is referred to as a power saving status of the disk drive.

When turning on the power of a specific disk drive, the power control unit commands the corresponding feed unit to start the power supply.

The service processor SVP is used for managing the overall storage apparatus 10. The service processor SVP is connected to an internal bus 32 of the storage apparatus 10 via a LAN configured using the Ethernet (registered trademark) or the like. The service processor provides various types of information concerning the storage apparatus 10 to a system administrator, and reflects the commands given from the system administrator in the storage apparatus 10. Specifically, the service processor receives a command from a management terminal to refer to the shared memory 28 or change its contents, and then issues a command to the control processor 26. The service processor additionally issues commands to the power control unit 20.

The connection 32 is configured from a crossbar switch or the like. The connection adjusts the competition of the input data signals, switches the path of the data signals, and thereby creates the path of the source module and the destination module. The connection may also be a packet-switched switching device.

As shown in FIG. 1, with the storage control system, the control processor 26 confirms the status of the logical volumes 18 (18A, 18B) by referred to the control table of the shared memory 28, and the control processor 26 switches the disk drives 14 configuring the logical volumes that are not in an online status with the host computer 3 to a power saving status via the controller 16.

If a volume is in an online status, this means that the host computer 3 is accessing the volume 18 or is in a state of being able to access the volume 18. Contrarily, if a volume is in an offline status, this means that the host computer 3 is not accessing the volume 18, or is in a status that is not yet ready to access the volume 18.

For instance, if the host computer is a mainframe system, the storage apparatus 10 determines whether the volume is in an online status or an offline status based on the path group that is being used by the mainframe system.

The path group is now explained. When making the volume an online target, the mainframe system forms a path group which groups accessible logical paths, and forms a logical connection between the host computer and the volume to be accessed by adding such volume to be accessed to the path group.

Figure 2:
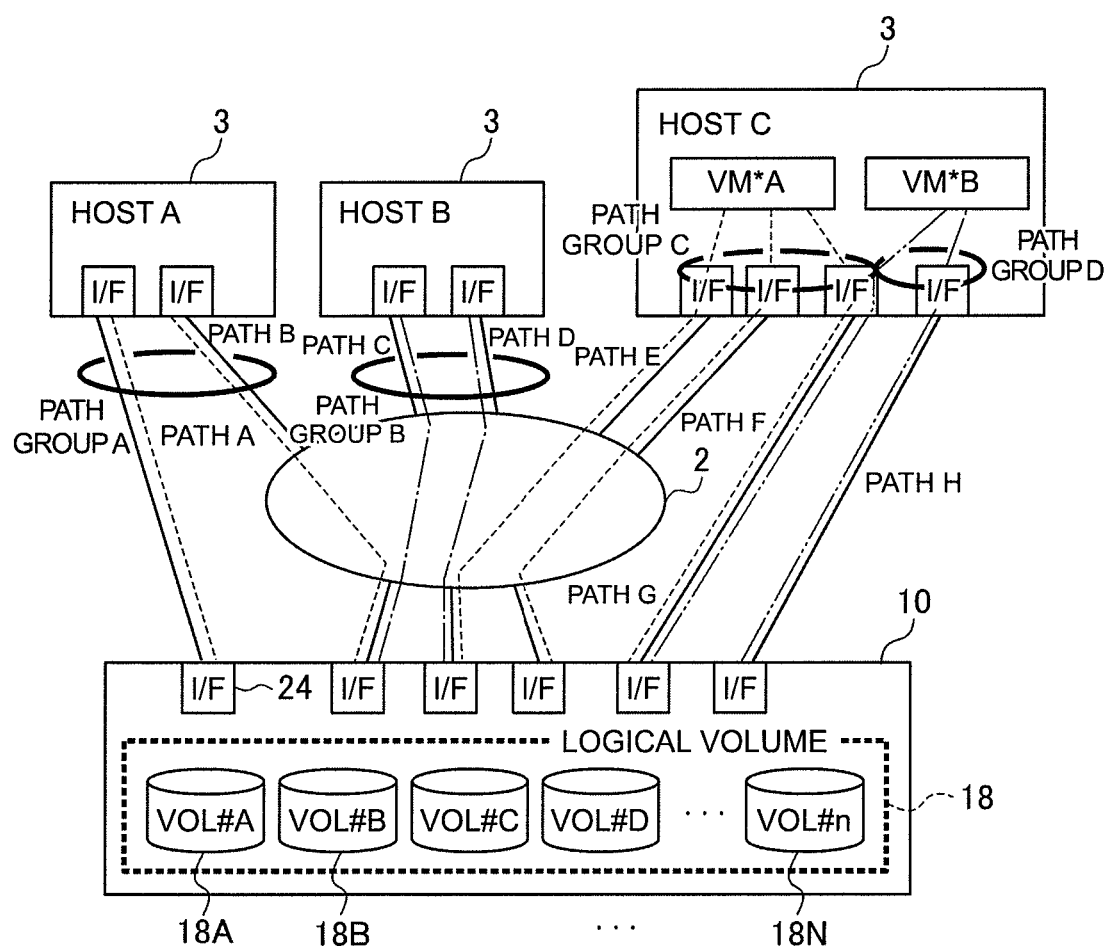
FIG. 2 is a functional block diagram explaining a path group formed between a host computer and the storage apparatus.

FIG. 2 is a block diagram explaining the path group. When a host A is to form a path group A, the host A issues a path group set command including ID information showing the path group A from both a path A and a path B to the volume to be added to the path group A. Similarly, when a host B and a host C are to also respectively form a path group, the host B and host C issue a path group set command including ID information showing a self-path group from all paths in the path group to the volume to be added. Even in cases like the host C that has a VM (Virtual Machine), the host C forms a path group for each VM. The path group set command includes a command concerning the path group to the volume (formation of path group, withdrawal from path group, etc.) and ID information showing the path group.

The path group is registered and managed as a path management table in the shared memory 28 of the storage apparatus 10. When the control processor 26 receives the path group set command, it registers the identifying information (DEV#) and path group ID of the logical volume in the path management table. FIG. 3 shows an example of the path management table. FIG. 3 shows that a logical path containing two path groups indicated as ID#01 and ID#n are set between the logical volume indicated as x0000 and the host computer 3.

When performing volume offline processing, the host computer issues a command to the volume to be made offline so that it is withdrawn from the path group. Upon receiving this command, the control processor 26 withdraws the volume from the path group. The control processor changes the path group management table (FIG. 3) of the volumes subject to offline processing. For example, although the path group of ID#01 and ID#03 is set to the volume of x0001, if the host computer 3 performs offline processing to this volume, the path group of ID#01 and ID#03 will be canceled.

FIG. 4 shows a volume management table. FIG. 4 shows that the logical volume of x0001 belongs to a parity group of the ID identified with #1, is arranged at a position identified with #0 in the parity group, and that this volume is in an offline status. The parity group identified with #1 also includes logical volumes shown respectively as x0003, x0005 and x0007. The volume of x0003 exists at the #1 position in the parity group, the volume of x0005 exists at the #2 position in the parity group, and the volume of x0007 exists at the #3 position in the parity group. The volume of x0003 is in an offline status, the volume of x0005 is in an online status, and the volume of x0007 is also in an online status. If at least one path group is allocated to a volume, it means that the volume is in an online status, and, if there is no path group that is allocated to a volume, it means that the volume is in an offline status. Each time the control processor 26 receives a path group set command or a path group cancellation command from the host, it updates the path group management table of FIG. 3 and the volume management table of FIG. 4, and also registers the volume management table in the shared memory 28. When the control processor 26 detects the path group formation command from the host computer, it determines that the volume that was subject to this command is in an online status. Meanwhile, when the control processor 26 receives a path group release or withdrawal command, it determines that the volume that was subject to this command is in an offline status.

Figure 5:
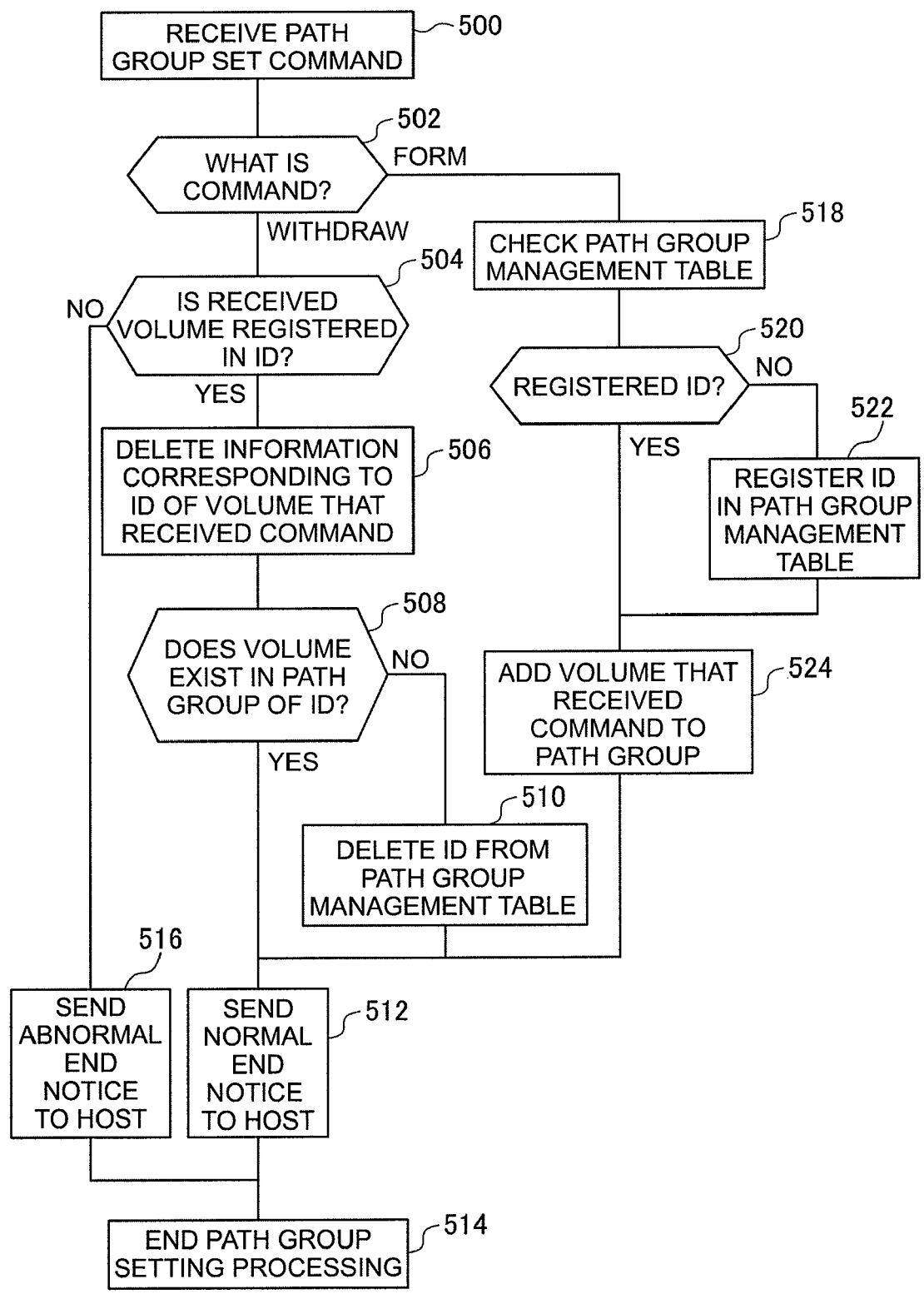
FIG. 5 is an operational flowchart of the storage apparatus to process a command for forming a path group and a command for withdrawing from a path group.

FIG. 5 shows a flowchart to be executed when the control processor 26 receives from the host computer 3 a command (path group set command) for forming a path group or cancelling a path group. When the control processor receives this command (500), it checks the instructions of the command (502). If the command is a path group formation command, the control processor 26 refers to the path group management table (FIG. 3) (518), and determines whether the path group ID contained in the command is registered in the path group management table (520).

If the control processor obtains a negative result in this determination, the control processor registers the path group ID contained in the command in the path group management table (522). Subsequently at step 522, or when a positive result is obtained in the determination at step 520, the control processor adds the volume ID contained in the command to the path group contained in the command (524). Subsequently, the control processor sends a response to the host computer to the effect that the command processing ended normally.

If the instructions of the command at step 502 are to withdraw the volume from the path group, the control processor 26 checks whether the path group ID is registered in the path management table (504). If the path group ID is not registered in the path group management table, the control processor sends an abnormal end notice to the host computer to disable the withdrawal of the volume from the path group (516).

If it is determined at step 504 that the path group ID is registered in the path group management table, the control processor deletes information regarding the ID of the volume that received the command from the path group management table (506). Subsequently, the control processor 26 determines whether other volumes are allocated to the path group contained in the command (508). If the control processor obtains a positive result in this determination, the host computer issues a normal end notice (512). Meanwhile, if it is determined at step 508 that other volumes are allocated to the path group, the control processor 26 deletes the path group ID from the management table and thereafter proceeds to step 512. The control processor 26 subsequently proceeds to step 514 and then ends the path group setting processing.

In addition to the path group setting processing, the control processor performs processing to subject the disk drives forming volumes in an offline status to power saving, or switch such disk drives to a power saving status. The control processor switches the disk drives to the power saving status based on the power saving-target volume bitmap table shown in FIG. 6. The control processor creates the power saving-target volume bitmap table (FIG. 6) based on the volume management table (FIG. 4), and registers this in the shared memory 28.

In FIG. 6, a volume in the parity group corresponds to each bit of the power saving-target bitmap. The control processor refers to the volume management table and checks, for each parity group, whether the volumes belonging to the parity group are in an online status or an offline status. If the volumes are in an offline status, the control processor 26 shows that the volume is in an offline status by turning on the corresponding bit.

If a power saving-target flag is set to all bits of the same parity group, the control processor subjects the disk drives belonging to that parity group to power saving (or switches such disk drives to a power saving status). Incidentally, it is also possible to set a threshold value to the number of power saving-target bits that are set, and, even though all bits are not turned on, the party group may be set to a power saving status if the number of bits that are turned on is greater than the threshold value.

When setting a plurality of disk drives to a power saving status, in addition to collectively setting all drives to the power saving status, the disk drives may be gradually set to the power saving status for every certain number of drives. The power saving of the drives is performed by the controller 16 under the control of the control processor 26.

In FIG. 6, the power saving inhibition flag is set by the administrator via the SVP, and this is information for inhibiting the power saving of the parity group. Even with a volume that is in an offline status with the host computer, since there are cases where there is an application or a function that accesses the volume, it is possible to inhibit the memory device containing that volume from entering the power saving status at a timing that is not intended by the user of the host computer by the administrator designating that volume.

As this kind of volume, there is a volume in a copy pair relationship and a backup volume. Incidentally, with a volume such as a backup volume that is infrequently accessed from an external device and which is normally not connected to an external device, and which is used by a function of the storage apparatus, it is also possible to know the timing that the external device will access such volume from the storage apparatus side. Thus, the storage apparatus may also switch the disk drives to a power saving status in accordance with the timing that the volume is accessed.

The different patterns upon subjecting a plurality of disk drives to power saving are now explained. With RAID, a logical volume is configured to a disk drive group referred to as a parity group. Thus, the number of drives that use a single volume will be plural, and there are several patterns upon switching the plurality of drives to a power saving status. Firstly, all drives belonging to a parity group are simply switched to the power saving status. Secondly, drives other than the drives in which the VTOC areas are consolidated in the parity group are switched to the power saving status. Thirdly, VTOC information is made to be resident in the control memory such as a cache memory or a shared memory, and all drives in the parity group are switched to the power saving status.

A VTOC (Volume Table Of Contents) is a data table providing information of files for managing information concerning files with a magnetic disk or the like. A VTOC is preliminarily provided with information such as the file name, file creation date, file organization, recording format of records, recording position of files in the disk and the like as management information.

The VTOC is stored in a fixed area of the disk drive. Thus, when creating RAID, the areas are arranged so that the VTOC information is consolidated in a single hard disk drive. Moreover, the VTOC area and the user data may coexist in a single hard disk drive, or only the VTOC area may be provided to the hard disk drive. As a result of consolidating the VTOC information of the parity group in a single hard disk drive, all remaining disk drives may be switched to the power saving status.

When the host performs volume online processing to the volumes, since the access to the VTOC information will become the initial access to the disk drive, by keeping the disk drive in which the VTOC information is consolidated in an operating condition, the storage apparatus is able to return a response from the disk drive in an operating condition to the host system immediately during the volume online processing.

Figure 7:
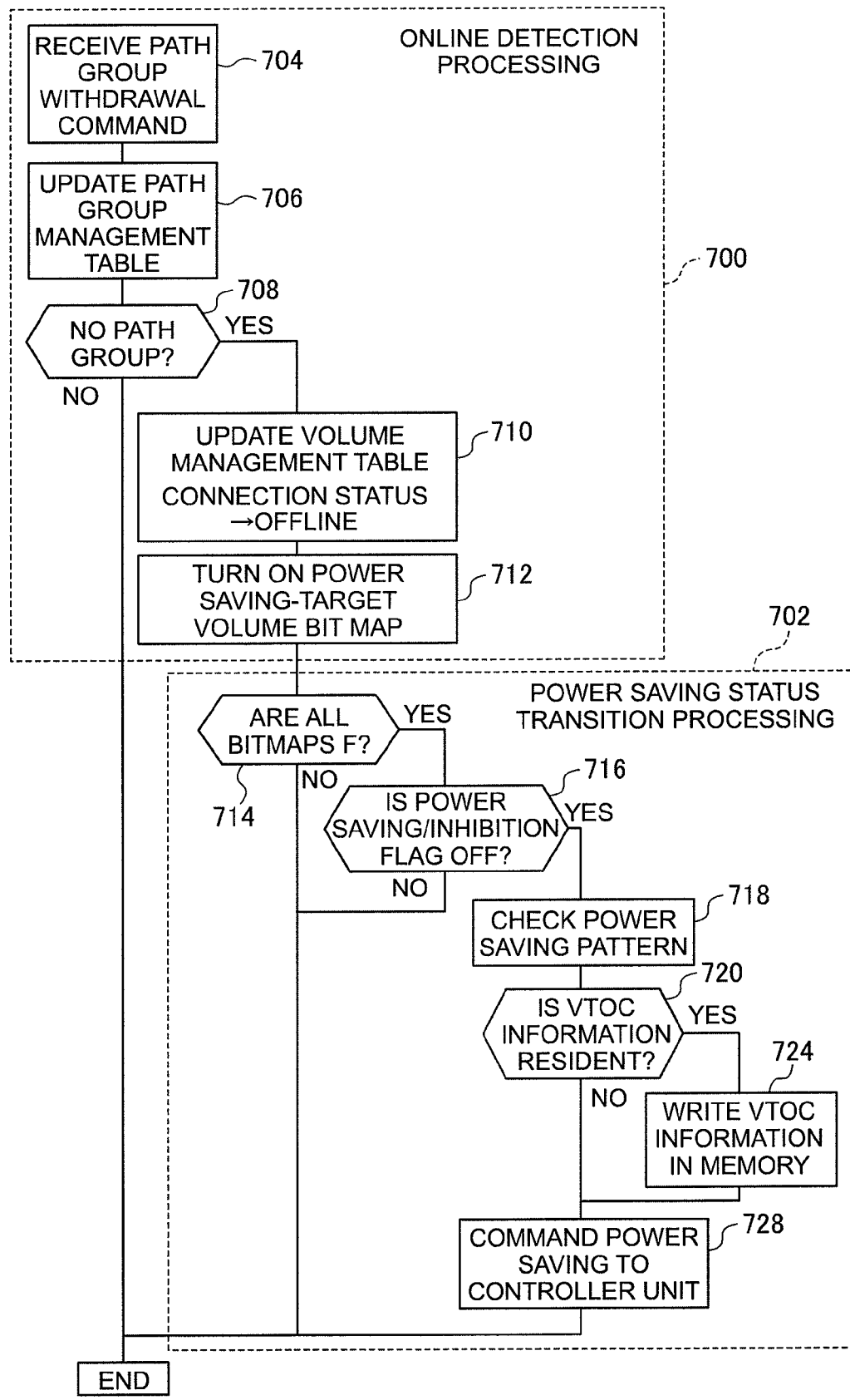
FIG. 7 is a flowchart of the storage apparatus explaining the detection of an offline status of the logical volume and the processing of setting memory devices to a power saving status.

FIG. 7 is a flowchart showing the control processing for the control processor to switch the memory devices to a power saving status. This flowchart is configured from processing 700 for detecting that the offline processing to be performed to the volumes has been requested from the host computer to the storage apparatus, and processing 702 for changing the memory devices to a power saving status.

In the former processing 700, the control processor foremost receives from the host computer a command for withdrawing a specific volume from the path group (700). Subsequently, the control processor updates the path group management table based on this command (706). However, if the path group designed in the command does not exist in the path group management table in the processing at step 706, the processing of FIG. 7 is ended. Meanwhile, if the volume path group exists, the control processor updates the connection status of the volume designated in the command to the host computer from "online" to "offline" in the volume management table (FIG. 4). Subsequently, the control processor turns on the power saving-target volume bit of the volume that was made to go offline based on the volume management table of FIG. 4.

Subsequently, the control processor proceeds to the power saving status transition processing 702. Foremost, the control processor checks whether there is a parity group in which all power saving-target bitmaps are "on" (714). If such a parity group does not exist, it is deemed that a disk drive group to be subject to power saving does not exist, and the processing of FIG. 7 is ended.

If the control processor obtains a positive result in the determination of the processing at step 714, the control processor, at step 716, refers to the bitmap table of FIG. 6 regarding the parity group in which the disk drive group was determined to be subject to power saving and checks whether the power saving inhibition flag is off. As a result of giving priority to the power saving inhibition flag in the power saving determination of the disk drive, even if a volume becomes an offline status with the host computer, the disk drive including the backup volume or the like is prevented from being subject to power saving, and the backup volume is thereby able to maintain its online status. If the power saving inhibition flag is not off at step 716, the control processor ends the flowchart of FIG. 7 without subjecting the disk drive to power saving.

If the control processor determines at step 716 that the power saving inhibition flag is on, it refers to the bitmap table of FIG. 6 and checks the power saving pattern at step 718. The power saving pattern is set by the administrator in the control table via the SVP. If the control information showing the power saving pattern causes the VTOC information to be resident in the shared memory 28 or the cache memory 29 (720), the control processor transfers the VTOC information from the disk drive to the shared memory. Subsequently, the control processor sends control information to the controller 16 so as to subject the disk drive to power saving according to the power saving pattern. The processing of FIG. 7 is thereafter ended.

Figure 8:
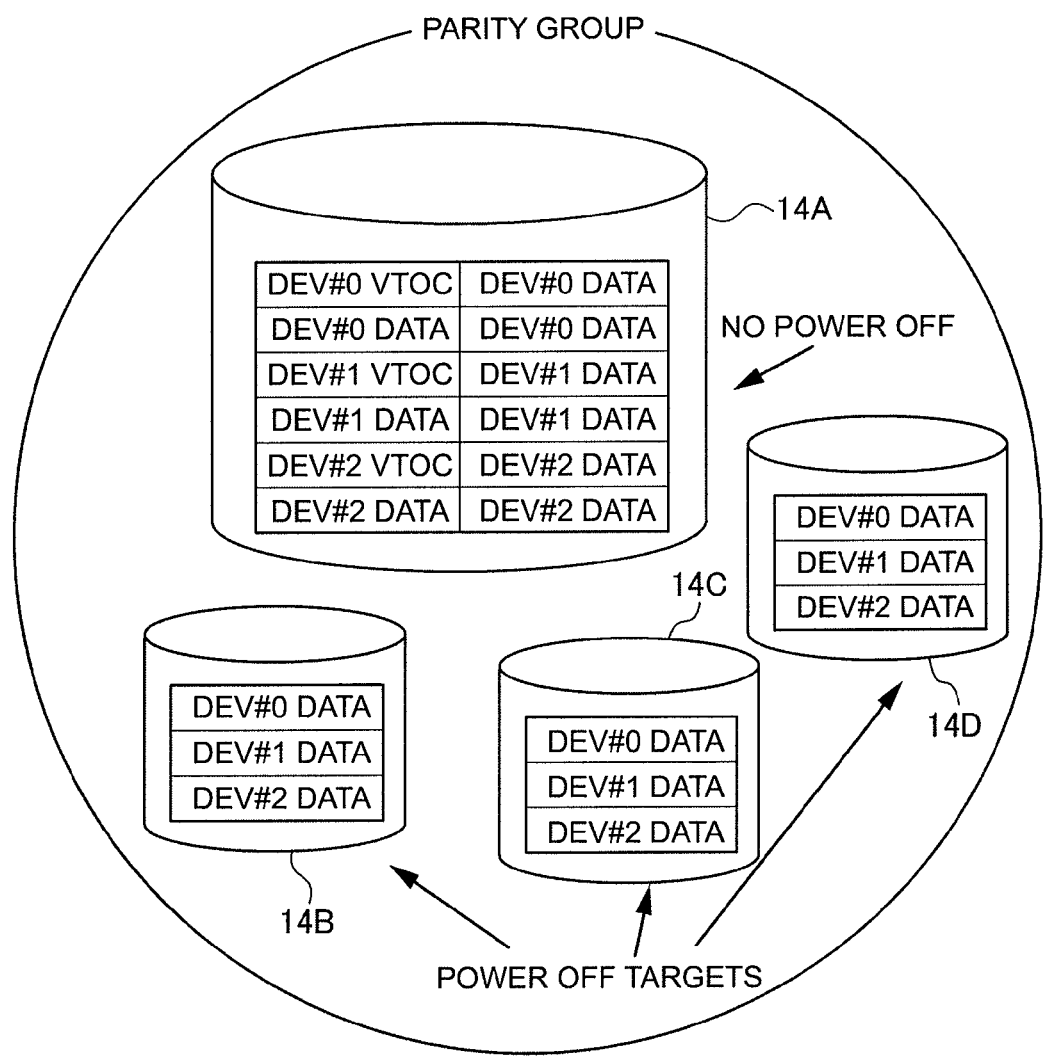
FIG. 8 is a block diagram of a plurality of disk drives showing a state where VTOC areas are being consolidated into a single disk drive among the disk drives configuring a parity group.

FIG. 8 is a block diagram showing, among the power saving patterns, a pattern in which the "VTOC is on." The control processor is consolidating the VTOC information of a plurality of disks belonging to the parity group in the disk drive 14A. Data of the logical volumes is stored in the other disk drives 14B, 14C, 14D, and, because the VTOC area is not stored therein, the control processor switches the disk drives 14B, 14C, 14D to a power saving status (power off).

Meanwhile, since the disk drive 14A contains the VTOC area, it is not switched to the power saving status. The storage apparatus is able to receive from the host computer a command to volume-specific information even if the volume is in an offline status with the host computer. The respective commands in FIG. 10 described later; namely, confirmation of volume implementation, reading of volume information, and reading of system information correspond to the foregoing command.

However, even in this case, since the host computer will not access the data of the disk drive, it is necessary to switch the disk drive to the power saving status. Thus, by concentrating the VTOC areas to a specific disk drive of the parity group or causing them to be resident in the control memory, it is possible to maintain the power saving status of a majority of the disk drives while responding volume-specific information to the host computer.

The processing (by the control processor) of switching the disk drive from the power saving status to an operating condition when a storage apparatus, in which the disk drives are in a power saving status, receives a volume online processing command from the host computer is now explained. The volume online processing is performed before the data read command is sent from the host computer to the storage apparatus.

In the volume online processing, the host computer issues a plurality of commands to the online-target volumes. Here, a plurality of control/sense system commands that require no access to the hard disk drive are issued from the host computer to the control processor.

The control processor checks these commands and determines whether they are volume online processing. FIG. 9 shows an example of the control/sense system command.

When the control processor receives a volume online processing request from the host computer, specifically, as shown in FIG. 10, when the control processor receives a path group formation command 104, it issues a start-up command (106) to the hard disk drives in a power saving status for forming the parity group. Subsequently, the control processor receives a command for reading the volume-specific information and setting the volume as shown in FIG. 10 until it receives a read command 108 from the host computer for reading the VTOC information. After the control processor processes the commands from the host computer, it returns an end response to the host computer.

Meanwhile, after the control processor receives the volume setting online processing request from the host computer, the disk drives in a power saving status are started up. Here, if the disk drives are in a power off status, a certain amount of time is required until the disk drives become a ready status. If the storage apparatus receives a read command based on the VTOC information until the disk drives become a ready status as a result of the VTOC area being resident in the cache memory and all disk drives belonging to the parity group being in a power saving status, since the storage apparatus is unable to access the disk drives and perform data processing, it will repeat a retry request response to the host computer. However, if a read command cannot be processed for a given period of time, the host computer will detect a timeout and the processing will be ended abnormally. This applies to cases even if the disk drive in which the VTOC areas are consolidated is in an operating condition or if the other disk drives belonging to the same single parity group are in a power saving status.

Figure 10A:
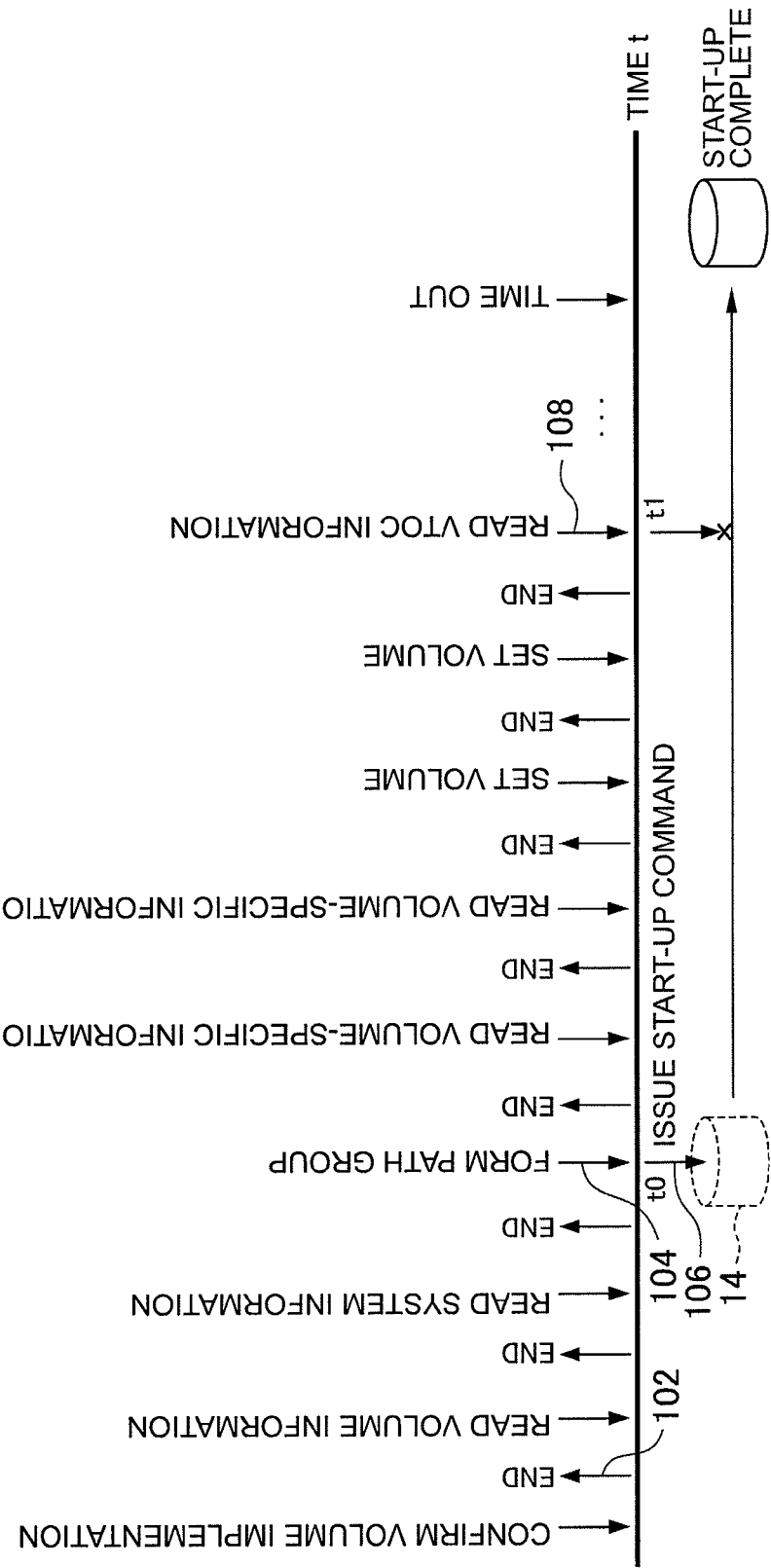
FIG. 10A show a sequence list of a plurality of commands sent from the host computer to the storage apparatus according to the present invention.

FIG. 10A is a time chart showing the foregoing state, and shows that the time t1 that the control processor received a read command for reading the VTOC information is before the start-up of the disk drives is complete, and the start-up time of the disk drives is after the timeout. Consequently, the host computer notifies the timeout of the read command to the storage apparatus.

Thus, during the command sequence to be issued from the host computer when switching the volume in an offline status to an online status, it is effective to issue the VTOC information read command to be issued from the host computer to the VTOC area as late as possible in the response time frame of the storage apparatus to the host computer so as to buy time for starting up the disk drives.

Figure 10B:
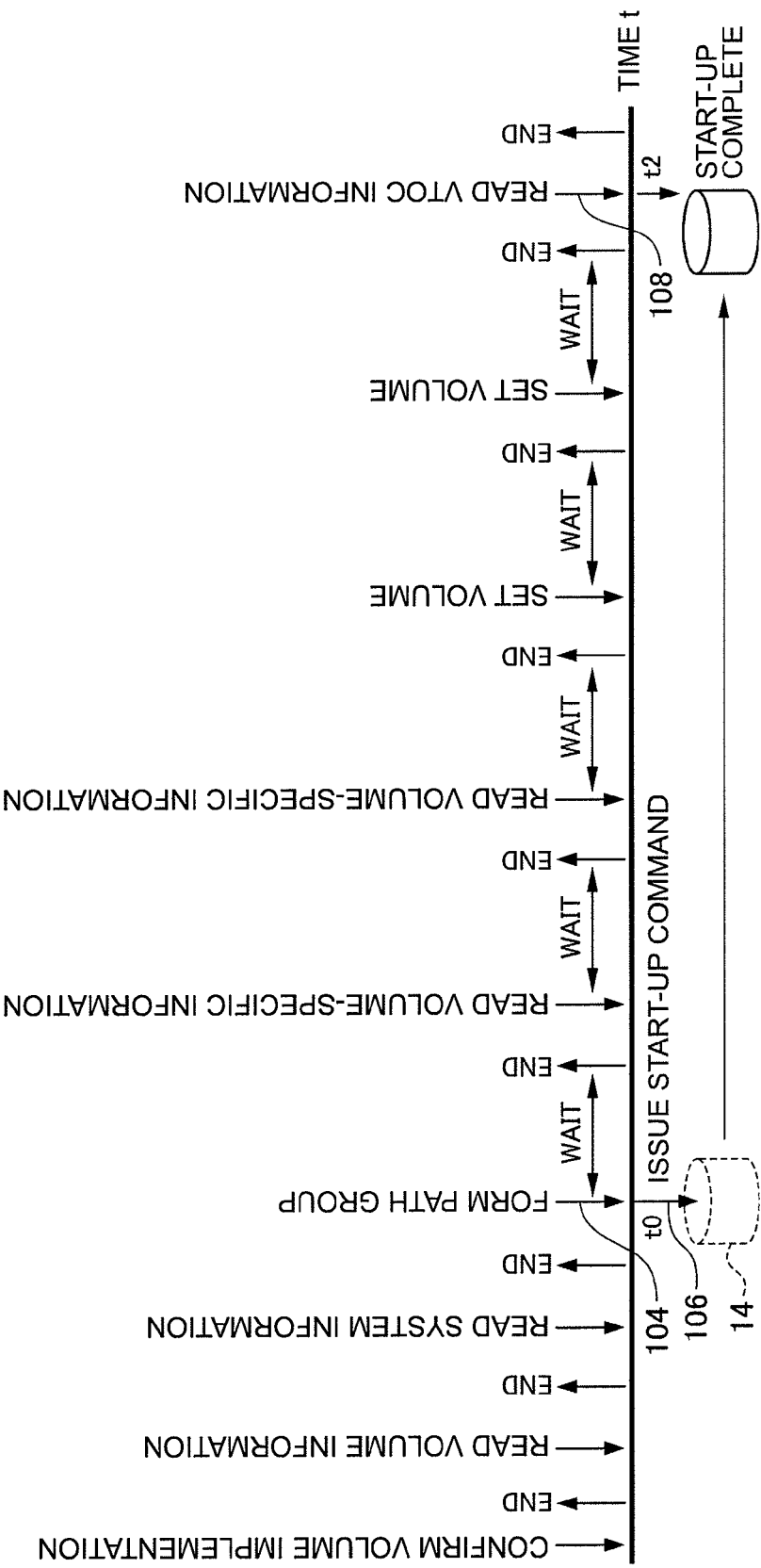
FIG. 10B show a sequence list of a plurality of commands sent from the host computer to the storage apparatus according to the prior arts.

As shown in FIG. 10B, after receiving the path group set command 104 and before the read command 108 of the VTOC information is issued from the host computer, delay/wait is added within the scope of the response time to at least one of the responses from the control processor to the host computer. Consequently, the time (t2) in which the read command 108 of the VTOC information is issued is made to be after the power of the power saving disk drive is turned on (spinup).

Accordingly, in FIG. 10B, timeout will not occur in the read command from the control processor to the host computer. If the time that the path group formation command is issued from the host to the storage apparatus is t0, in FIG. 10A, the time that the read command of the VTOC information is issued will be t1, and the elapsed time during this period will be (t1−t0). Meanwhile, in FIG. 10B, the time that the read command of the VTOC information is issued will be t2, which is after t1. The elapsed time during this period will be (t2−t0).

In the example of FIG. 10B, since delay/wait is added to the timing of response from the control processor to the host computer in comparison to the example of FIG. 10A, this will become (t2−t0)>(t1−t0), and the issuance of the read command of the VTOC information will be after the start-up of the disk drives is complete. The delay may be set within a range that will not cause a timeout on the host computer side.

Figure 11:
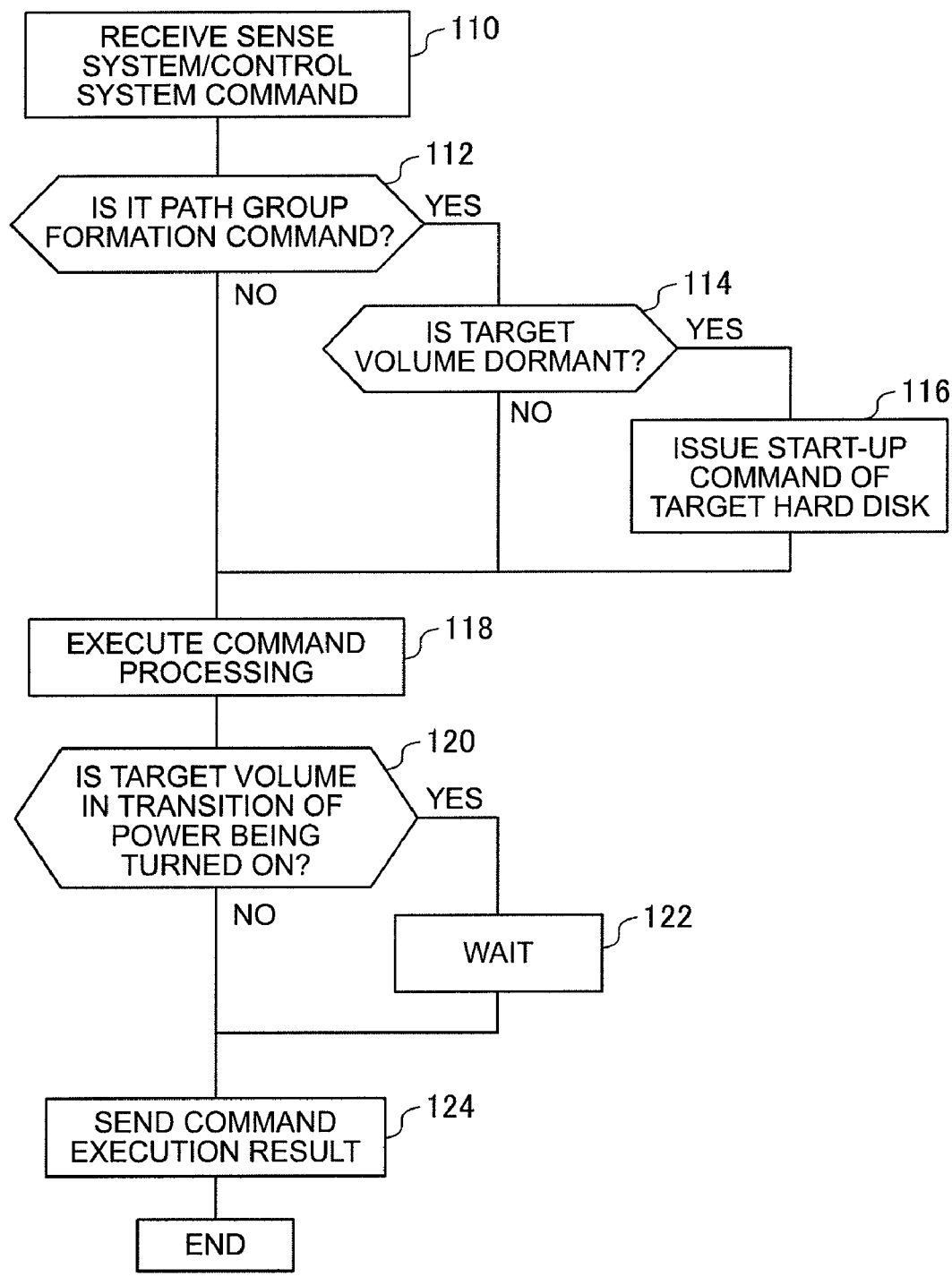
FIG. 11 is a flowchart explaining the process of delaying a response of the storage apparatus to a command sent from the host computer to the storage apparatus.

FIG. 11 is a flowchart showing the operation of the control processor in FIG. 10B. If the control processor receives a sense system/control system command from the host computer during the period from setting the volume implementation to the reading of the VTOC information in FIG. 10 (110), the control processor determines whether the command is a command requesting that the volume is made to be an online status; that is, whether the command is a path group formation command (104 of FIG. 10) (112).

Subsequently, the control processor refers to the control table of FIG. 6 and determines whether the volume subject to the command is in an offline status (114). If the control processor obtains a positive result in this determination, it issues a start-up command (106 in FIG. 10) to the disk drive in a power saving status with this volume formed therein (116).

If a negative result is obtained in the determination at step 112 and a negative result is obtained in the determination at step 114, the control processor starts executing the various commands sent from the host computer (118). Here, the control processor checks whether the disk drive loaded with the volume to be switched to an online status is being started up; that is, whether the power of the disk drive is in the transition of being turned on (120).

If the control processor obtains a positive result in this determination, as shown in FIG. 10B, it waits to send the response of the execution result of the control processor to the commands after the issuance of the path group formation command (122, 124). Meanwhile, if the control processor obtains a negative result in the determination at step 120, in FIG. 10B, a response from the control processor is returned to the host system without any waiting added thereto like a response to a command issued before the reception of the path group formation command (124). The sequential processing shown in FIG. 11 is thereby ended.

In the embodiment described above, although the host computer was explained as a mainframe system, the present invention can also be applied to an open system.

Moreover, in the embodiment described above, although the power saving of the memory devices was explained as the on and off of the power source, this may also be achieved with spinup and spindown, or normal rotation and low rotation.

Further, in the embodiment described above, although the power saving of the memory devices was explained based on the parity group, the necessity of power saving can also be determined with a stand-alone disk drive. Furthermore, the storage apparatus can also control the power saving of disk drives in virtual volume units to be presented to the host computer.

In addition, in the explanation described above, although one hard disk drive was provided for collectively storing the VTOC areas for each parity group, all VTOC information of the storage apparatus may also be consolidated in a single drive. Incidentally, the disk drive in which the VTOC information is consolidated and stored is normally maintained in a state where the power is always on or a low rotation status; that is, in a start-up status or a ready status regardless of whether the other disk drives are being subject to power saving.

INDUSTRIAL APPLICABILITY

The present invention can be applied to the power saving of storage apparatuses.

The invention claimed is:

1. A storage apparatus, comprising:
an interface connected to a host computer;
a plurality of memory devices;
a control unit for managing a plurality of parity groups configured from the plurality of memory devices, each parity group corresponding to at least one logical volume provided to the host computer by the control unit; and
a control memory storing control information and user data, the control information indicating a status of each of a plurality of logical volumes corresponding to the plurality of said parity groups and relationships between the plurality of parity groups and the plurality of logical volumes;

wherein the control unit is configured to:
set the status of one of the plurality of logical volumes to an online status so that the host can access to the one of the plurality of logical volumes, in response to a command from the host computer to form a logical connection to the one of the plurality of logical volumes: and
set the status of one of the plurality of logical volumes to an offline status so that the host computer cannot access to the one of the plurality of logical volumes, in response to a command from the host computer to cancel the logical connection,
wherein the control memory further contains an inhibition flag which is set to a certain logical volume to be used for a backup operation executed by the control unit while a status of the certain volume keeps offline status; and
wherein the control unit applies power saving processing to a first plurality of memory devices of a first parity group if the status of any logical volumes corresponding to the first group is offline status and the inhibition flag is not set to the any logical volumes corresponding to the first group based on the control information.

2. The storage apparatus according to claim 1,
wherein the host computer is configured from a mainframe system;
wherein the plurality of memory devices configure a parity group;
wherein the host computer is able to set a logical path group to each of the plurality of logical volumes; and
wherein the control unit stores a VTOC area of each of the plurality of logical volumes in a first device among the plurality of memory devices configuring the parity group,
determines that the logical volume set with the logical path group is in the online status with the host computer, and determines that the logical volume not set with the logical path group is in the offline status with the host computer,
upon determining that the plurality of logical volumes belonging to the parity group are in the offline status, sets devices other than the first device among the plurality of memory devices configuring the parity group to a power saving status, and
upon receiving a command from the host computer for setting the logical path group to the logical volume in the offline status, delays a response to commands that are issued until a read command for reading the VTOC area is issued from the host computer, and starts up the memory devices in the power saving status before the read command for reading the VTOC area is issued from the host computer.

3. The storage apparatus according to claim 1,
wherein the host computer is configured from a mainframe system;
wherein the plurality of memory devices configure a parity group;
wherein the host computer is able to set a logical path group to the respective logical volumes; and
wherein the control unit stores a VTOC area of each of the plurality of logical volumes in the control memory,
determines that the logical volume set with the logical path group is in the online status with the host computer, and determines that the logical volume not set with the logical path group is in the offline status with the host computer,
upon determining that a plurality of logical volumes belonging to the parity group are in the offline status, sets those plurality of memory devices of the parity group among the plurality of memory devices configuring the parity group to a power saving status, and upon receiving a command from the host computer for setting the logical path group to the logical volume in the offline status, delays a response to commands that are issued until a read command for reading the VTOC area is issued from the host computer, and starts up the memory devices in the power saving status before the read command for reading the VTOC area is issued from the host computer.

4. The storage apparatus according to claim 1, wherein the plurality of memory devices configure a parity group; and wherein, when the control unit determines that the plurality of logical volumes are in the offline status based on the control information, the control unit sets the plurality of memory devices belonging to the parity group to a power saving status.

5. The storage apparatus according to claim 4, wherein the host computer is configured from a mainframe system; and the control unit determines that the logical volume set with a logical path group from the host computer is in the online status, and determines that the logical volume released from the logical path group is in the offline status.

6. The storage apparatus according to claim 4, wherein the control unit consolidates and writes management information of data stored in the plurality of logical volumes into a first memory device among the plurality of memory devices belonging to the parity group, and sets the other memory devices belonging to the parity group other than the first memory device to a power saving status.

7. The storage apparatus according to claim 4, wherein the control unit consolidates and writes management information of data stored in the plurality of logical volumes into the control memory, and sets the plurality of memory devices belonging to the parity group to a power saving status.

8. The storage apparatus according to claim 4, wherein, if the logical volume is infrequently accessed from the host computer and is to be used in a special function of the host computer, the control unit sets the memory devices with the logical volume formed therein to a power saving status in accordance with the timing of being accessed by the host computer.

9. The storage apparatus according to claim 4, wherein, when the control unit receives a first command from the host computer for setting a logical volume in the offline status to an online status, the control unit delays the issuance of a second command from the host computer for reading a management area of stored data of the logical volume; and receives the second command after starting up the memory devices in the power saving status.

10. The storage apparatus according to claim 9, wherein the control unit delays, within a window of timeout, a response to other commands that are issued from the host computer between the first command and the second command.

11. A computer-implemented method implemented in a storage apparatus which includes:

an interface connected to a host computer;

a plurality of memory devices;

a control unit for managing a plurality of parity groups configured from the plurality of memory devices, each parity group corresponding to at least one logical volume provided to the host computer by the control unit; and a control memory storing control information and user data, the control information indicating a status of each of a plurality of logical volumes corresponding to the plurality of said parity groups and relationships between the plurality of parity groups and the plurality of logical volumes;

wherein the control unit is configured to:

set the status of one of the plurality of logical volumes to an online status so that the host can access to the one of the plurality of logical volumes, in response to a command from the host computer to form a logical connection to the one of the plurality of logical volumes: and set the status of one of the plurality of logical volumes to an offline status so that the host computer cannot access to the one of the plurality of logical volumes, in response to a command from the host computer to cancel the logical connection, wherein the control memory further contains an inhibition flag which is set to a certain logical volume to be used for a backup operation executed by the control unit while a status of the certain volume keeps offline status; and wherein the control unit applies power saving processing to a first plurality of memory devices of a first parity group if the status of any logical volumes corresponding to the first group is offline status and the inhibition flag is not set to the any logical volumes corresponding to the first group based on the control information.

* * * * *